United States Patent [19]

Krueger et al.

[11] Patent Number: 5,088,102
[45] Date of Patent: Feb. 11, 1992

[54] CO OR $CO_2$ WAVEGUIDE LASER

[75] Inventors: Hans Krueger, Munich; Hubert Weber, Augsburg, both of Fed. Rep. of Germany

[73] Assignee: Siemens Aktiengesellschaft, Munich, Fed. Rep. of Germany

[21] Appl. No.: 659,072

[22] Filed: Feb. 22, 1991

[30] Foreign Application Priority Data

Mar. 1, 1990 [DE] Fed. Rep. of Germany ....... 4006460

[51] Int. Cl.$^5$ ............................................. H01S 3/03
[52] U.S. Cl. ........................................ 372/64; 372/87; 372/59
[58] Field of Search ................. 372/64, 87, 59, 66, 372/95

[56] References Cited

U.S. PATENT DOCUMENTS

| | | | |
|---|---|---|---|
| 4,756,000 | 7/1988 | Macken | 372/59 |
| 4,757,512 | 7/1988 | Macken | 372/59 |
| 4,875,218 | 10/1989 | Hongo et al. | 372/64 |
| 4,897,848 | 1/1990 | Macken | 372/59 |
| 4,991,181 | 2/1991 | Upchurch et al. | 372/59 |

OTHER PUBLICATIONS

IEEE Journal of Quantum Electronics, vol. QE-20, No. 3, Mar. 1984, John H. S. Wang et al., "Radio Frequency Pumped Mid-Infrared Waveguide Lasers", pp. 276-283.

Primary Examiner—Léon Scott, Jr.
Attorney, Agent, or Firm—Hill, Van Santen, Steadman & Simpson

[57] ABSTRACT

In a CO or $CO_2$ waveguide laser of the sealed-off type having transversal excitation, an enhancement of the useful life is achieved in that the electrodes 1 and 2 of metal that serve as waveguiding surfaces are coated with a layer insensitive to oxidation by the adjoining plasma and which has a roughness that is adequately low for the waveguiding. The invention can be particularly advantageously utilized for $CO_2$ ribbon conductor or stripline lasers.

12 Claims, 1 Drawing Sheet

CO OR CO₂ WAVEGUIDE LASER

BACKGROUND OF THE INVENTION

The invention is directed to a CO or $CO_2$ waveguide laser of the sealed-off type having transversal excitation and which contains two metal electrodes that serve as waveguide surfaces which are separated from one another by inserter strips. Such a laser is known from IEEE Journal of Quantum Electronics, Vol. QE 20, No. 3, March 1984, incorporated herein by reference. Two aluminum electrodes of polished aluminum are utilized therein. Just like many other metals, however, aluminum reacts with the oxygen of the plasma of a CO or $CO_2$ waveguide laser. It has been shown that the oxygen content in a sealed-off laser is thereby steadily reduced over a long time, so that the laser characteristics change and the useful life does not correspond to what was anticipated. The formation of aluminum oxide under the conditions of laser discharge thereby does not lead to a dense, insensitive layer of aluminum oxide, or does not lead thereto in an adequately short time.

SUMMARY OF THE INVENTION

An object on which the present invention is based is to enhance a useful life of the laser without loss of quality. This is achieved according to the invention by coating the electrodes with a passivation layer that is insensitive to oxidation by the adjoining plasma, this layer having a low roughness that does not disturb the wave guiding.

Passivated layers of aluminum, chromium, and nickel, i.e. layers of aluminum, chromium, and nickel that no longer noticeably change under the influence of ionized oxygen or laser plasma, or layers of precious metals, particularly gold, platinum, and palladium, are thereby suitable as layers insensitive to oxidation due to the adjoining plasma. These layers can be produced with high quality and high surface smoothness. Given employment of aluminum layers, it is desirable that the aluminum is applied in a form of a highest grade aluminum. A highest grade aluminum can be extremely well-smoothed and, upon oxidation, yields dense and smooth oxide layers that do not negatively influence the waveguide properties. It is therefore precisely these highest grade aluminum layers that are suitable for being passivated by an aluminum oxide layer. This aluminum layer should be less than 1 μm thick so that the unavoidable losses due to the waveguiding are not increased by roughness.

The electrodes are preferably manufactured of easily workable and highly thermally conductive material; in particular, copper or aluminum are suitable. When aluminum alloys are employed as an electrode material, it is desirable that a layer of nickel is first applied thereon; this is then followed by a layer of highest grade aluminum; and the exposed surface of the highest grade aluminum layer is coated with a passivation layer of the above described type. Rough layers that tend to form given aluminum alloys are thus avoided; and layers that are oxidation-resistant over a long time are also achieved.

The waveguide laser is especially advantageously constructed as a slab or ribbon conductor or stripline laser. In such lasers, the wall stressing due to the plasma is relatively high; and the useful effect of the proposed passivation is especially high. An especially cost-beneficial structure can thus be achieved since ceramic strips are soldered in between the coated electrodes, these ceramic strips serving as a lateral limitation of the plasma space and as spacers for electrodes. This in-soldering of the strips is promoted by the applied passivation layers; an additional application of contact layers as are otherwise standard when soldering ceramic parts can be omitted.

The invention shall now be set forth in greater detail with reference to the drawing figures. The invention is not limited to the embodiments shown in the drawing figures.

DESCRIPTION OF THE PREFERRED EMBODIMENTS

Two electrodes 1 and 2 of a waveguide laser are provided with passivation layers 3 that adjoin the plasma space 8. Two ceramic strips 4 are soldered in between the passivation layers 3. They are soldered in on the electrodes 1 or 2 and serve as spacers for the electrodes and as a termination of the plasma space 8. The passivation layers 3 are insensitive to oxidation by the plasma in the plasma space 8. As a result thereof, the equilibrium of the ions in the plasma is preserved over a long time. Accordingly, the laser can satisfy the standard demands made of useful life, for example a useful life of five thousand hours.

Figure 1:
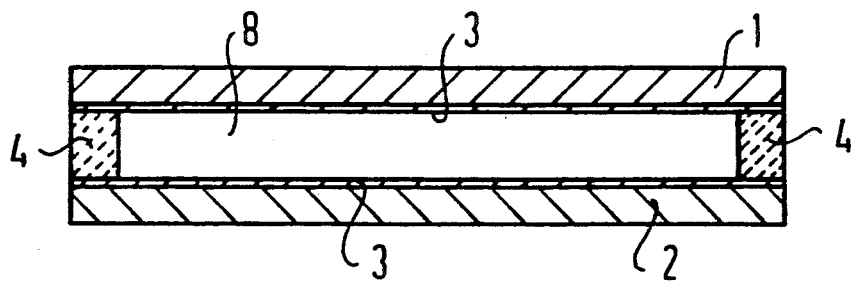
FIG. 1 is a cross-sectional view of the waveguide laser according to the invention taken along line I—I in FIG. 2.
Figure 2:
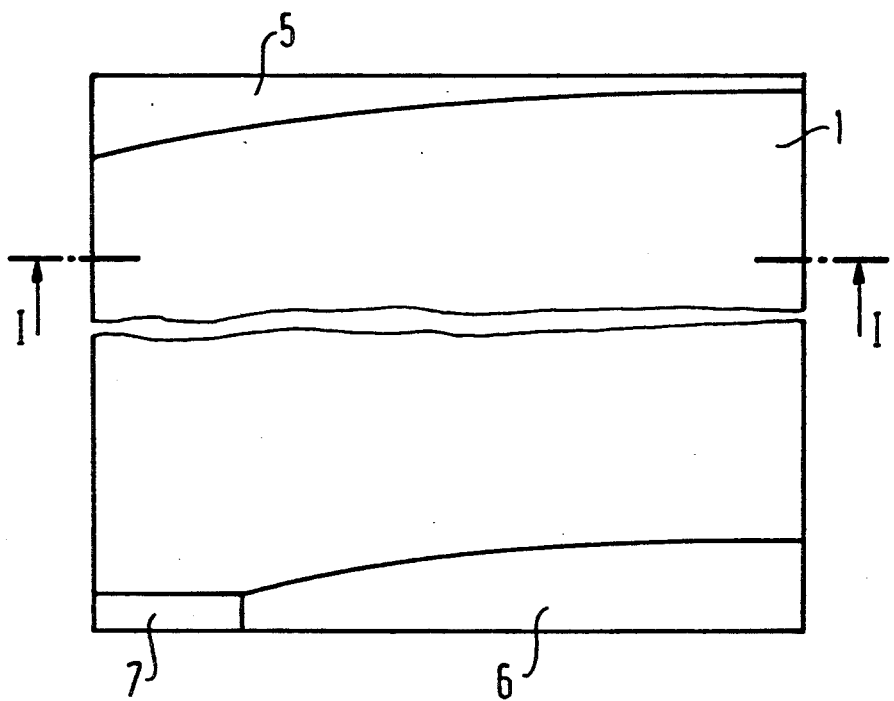
FIG. 2 is a plan view of the waveguide laser of the invention.

In the example illustrated in FIG. 2, a ribbon conductor or stripline laser having an unstable resonator is provided. There, the resonator is formed by the mirrors 5 and 6, and a beam exit window 7 is arranged adjoining the mirror 6. The wall stressing in such an intrinsically known laser structure is relatively high, and the advantage of the present invention is especially pronounced.

Although various minor changes and modifications might be proposed by those skilled in the art, it will be understood that we wish to include within the claims of the patent warranted hereon all such changes and modifications as reasonably come within our contribution to the art.

We claim as our invention:

1. A transversal excitation sealed-off type CO or $CO_2$ waveguide laser, comprising:
   two metal electrodes arranged as waveguide surfaces and separated from one another by insulator strips;
   the electrodes being coated with a passivation layer means which is insensitive to oxidation by an adjoining plasma within the laser; and
   said layer means having a roughness which is sufficiently small such that it does not substantially disturb waveguiding in the laser.

2. A waveguide laser according to claim 1 wherein the layer means coating the electrodes has a passivated material selected from the group consisting of Al, Cr, and Ni.

3. A waveguide laser according to claim 2 wherein the layer means comprises a highest grade aluminum.

4. A waveguide laser according to claim 3 wherein the electrodes comprise aluminum and the layer means comprises aluminum oxide which is smoothed, and wherein the aluminum oxide is a layer having a thickness of no greater than approximately 1 μm.

5. A waveguide laser according to claim 1 wherein the layer means coating the electrodes comprises a material selected from the group of precious metals consisting of gold, Pt, and Pd.

6. A waveguide laser according to claim 1 wherein the electrodes comprise passivated copper.

7. A waveguide laser according to claim 1 wherein the electrodes comprise passivated aluminum.

8. A waveguide laser according to claim 1 wherein the electrodes comprise an aluminum alloy, at least one layer of nickel is applied thereon, and a layer of highest grade aluminum being applied on the nickel layer, and the highest grade aluminum being coated with a passivation layer on its exposed surface.

9. A waveguide laser according to claim 1 wherein the laser is designed as a slab-type laser.

10. A waveguide laser according to claim 1 wherein the laser is designed as a ribbon conductor or stripline type laser.

11. A waveguide laser according to claim 1 wherein the insulator strips comprise ceramic strips soldered in between the coated electrodes, the ceramic strips being dimensioned to define a limitation of the plasma space and as spacers for the electrodes.

12. A CO waveguide laser, comprising:
two metal electrodes arranged as waveguide surfaces and separated from one another by insulators;
the electrodes being coated with a passivation layer means which is insensitive to oxidation by an adjoining plasma within the laser; and
said layer means having a roughness which is sufficiently small such that it does not substantially disturb waveguiding in the laser.

* * * * *